(12) United States Patent
Kruger et al.

(10) Patent No.: US 6,221,422 B1
(45) Date of Patent: Apr. 24, 2001

(54) PROCESS FOR PREPARING CHOCOLATE

(75) Inventors: Christof Kruger, Hamburg; Dietmar Freund, Unna, both of (DE)

(73) Assignee: Xyrofin Oy (FI)

( * ) Notice: Subject to any disclaimer, the term of this patent is extended or adjusted under 35 U.S.C. 154(b) by 0 days.

(21) Appl. No.: 09/408,147

(22) Filed: Sep. 29, 1999

Related U.S. Application Data

(63) Continuation-in-part of application No. 08/734,714, filed on Oct. 21, 1996, now abandoned, which is a continuation of application No. 08/341,771, filed on Nov. 18, 1994, now abandoned.

(51) Int. Cl.⁷ .................................................. A23G 1/00
(52) U.S. Cl. ........................................... 426/631; 426/660
(58) Field of Search ..................... 426/631, 660

(56) References Cited

U.S. PATENT DOCUMENTS

| | | | |
|---|---|---|---|
| 4,017,645 | 4/1977 | Ziccarelli | 426/660 |
| 4,980,189 | 12/1990 | Keme | 426/660 |
| 5,051,265 | 9/1991 | Meisler | 426/660 |
| 5,156,878 | 10/1992 | Tadema | 426/660 |
| 5,190,786 | 3/1993 | Anderson | 426/660 |
| 5,244,690 | 9/1993 | Schueren | 426/660 |
| 5,332,588 | 7/1994 | Capodieci | 426/660 |
| 5,360,621 | 11/1994 | Mentink | 426/660 |

FOREIGN PATENT DOCUMENTS 2033721   5/1980   (GB) .

OTHER PUBLICATIONS

Minifie, 1980, Chocolate, Cocoa & Confectionery: Science and Technology, Second Edition, AVI Publishing, Westport, CT, pp. 105–127.
Wolff–Cohen, 1994, Irresistible Chocolate, Anness Publishing Ltd., pp. 8–9.
Desrosier, 1977, Elements of Food Technology, AVI Publishing Co., Inc., Westport, CT, pp. 582, 585.

*Primary Examiner*—Carolyn Paden
(74) *Attorney, Agent, or Firm*—Knoble & Yoshida, LLC

(57) ABSTRACT

In the disclosed process for making chocolate, only part of the chocolate mass raw materials is mixed, roller refined and conched. This part contains the cocoa liquor and part of the cocoa butter, possibly part of the emulsifier and, when milk chocolate is to be prepared, also the ingredients derived from milk. The conched portion of the chocolate mass raw materials as a percentage of the total ingredients of the chocolate mass is about 30–60%, preferably 40–55%. Separate from said first part, another part of the raw materials, i.e. the sweetener or the major part thereof, part of the cocoa butter, the possible flavourings, and a small quantity of an emulsifier, is mixed and roller refined. This latter part is not conched. This roller-refined part of the mass is mixed with the conched part of the mass together with the remainder of the cocoa butter and emulsifier and the possible intense sweetener.

23 Claims, 3 Drawing Sheets

PROCESS FOR PREPARING CHOCOLATE

CONTINUING APPLICATION DATA

This application is a continuation-in-part of U.S. patent application Ser. No. 08/734,714 filed Oct. 21, 1996, now abandoned, which is a continuation of U.S. patent application Ser. No. 08/341,771, filed Nov. 18, 1994, now abandoned.

BACKGROUND OF THE INVENTION

1. Field of the Invention

The present invention relates to a process for preparing chocolate. In particular, the invention relates to a process for preparing chocolate wherewith significant savings in energy are achieved over the prior art processes. The process of the invention yields a chocolate product having good taste properties and a soft mouth feel. The advantages achieved with the invention in energy consumption are particularly significant when the chocolate is prepared using sucrose as a sweetener, but they are considerable also when the sweetener is other than sucrose.

2. Brief Description of the Prior Art

In this description and the appended claims, the term "sweetener" denotes a substance or mixture of substances imparting both bulk and sweetness to the chocolate product, and it may be sucrose or a sucrose substitute, such as fructose, glucose, a sugar alcohol (e.g. xylitol, sorbitol, mannitol, lactitol, maltitol, isomalt) or polydextrose or inulin together with a sugar alcohol and/or an intense sweetener (such as aspartame), or a mixture of these.

Basic processes for preparing chocolate and the effect of the different steps of the processes on the properties of the final product have been described, for instance, in Minifie, B. W., *Chocolate, Cocoa and Confectionery*, 2nd Edition, The AVI Publishing Company, Inc., Westport, Conn., 1982, pp. 107–125, and in *Ullmanns Enzyklopadie der technischen Chemie*, 4th Edition, Volume 20, Verlag Chemie, Weinheim, 1981, pp. 682–686.

In the most commonly used process for preparing chocolate (FIG. 1a), a base mass is formed of the chocolate raw materials (sweetener, cocoa liquor and part of the cocoa butter and, when milk chocolate is to be prepared, milk powder) by mixing and kneading them into a homogeneous, plastic mass. This base mass is processed further by roller refining, the main purpose of which is to diminish the particle size, thereafter by mechanical heat treatment, i.e. conching, prior to or during which the remainder of the cocoa butter and the possible emulsifiers, flavours and intense sweeteners are added. During the conching the final taste of the chocolate is developed and the desired consistency of the mass is achieved. The conching times required in such known methods are rather long, for example 16–24 h (cf. the above book by Minifie, p. 123), which will naturally significantly affect the energy costs and prolong the manufacturing process.

In the crumb process (FIG. 2b), specifically developed for producing milk chocolate with special flavor properties, the main part of the raw materials, i.e. sucrose, cocoa liquor and ingredients derived from milk and part of the cocoa butter, are formed into a solid granular intermediate, referred to as crumb, by mixing and vacuum drying/kneeding the ingredients, and the crumb is subjected to refining and conching with the rest of the raw materials. (Minifie p.???)

In both of these conventional processes the sweetener is included in the mixture subjected to conching.

In the process known as the CMC process (Chocolate liquor-Milk powder-Compounded process; cf. *Industrial chocolate manufacture and use*, p. 137), which has been known since c. 1980, off-flavours and moisture are removed from cocoa liquor/milk powder mixes in a Petzomate apparatus in which the mass is sprayed downwards in a thin film into a stream of hot air rising upwards.

The object of the present invention is a process by which a chocolate product having good organoleptic properties and texture is obtained while significant savings in time and energy are achieved over the methods previously employed.

SUMMARY OF THE INVENTION

These objects are achieved with the process of the invention (FIG. 2c), wherein only part of the chocolate mass raw materials is mixed, roller refined and conched. This part contains the cocoa liquor and part of the cocoa butter, possibly part of the emulsifier (which is usually lecithin) and, when milk chocolate is to be prepared, also the ingredients derived from milk, and its percentage in the total ingredients of the chocolate mass is about 30–60%, preferably 40–55%. Separate from said first part, another part of the raw materials, i.e. the sweetener or the major part thereof, part of the cocoa butter, the possible flavourings (e.g. vanillin, hazelnut paste) and a small quantity of an emulsifier, is mixed and roller refined; this latter part is not conched. This roller-refined part of the mass is mixed with the conched part of the mass together with the remainder of the cocoa butter and emulsifier and the possible intense sweetener. The roller refining of the mixture containing the sweetener or the major part thereof may be performed in one step when a milled sweetener is employed or in two steps when a crystalline sweetener is employed. If an ultra-fine sweetener (particle size £ about 20 i) is employed, this roller refining step is not needed.

DETAILED DESCRIPTION OF THE PREFERRED EMBODIMENTS

Figure 1A:
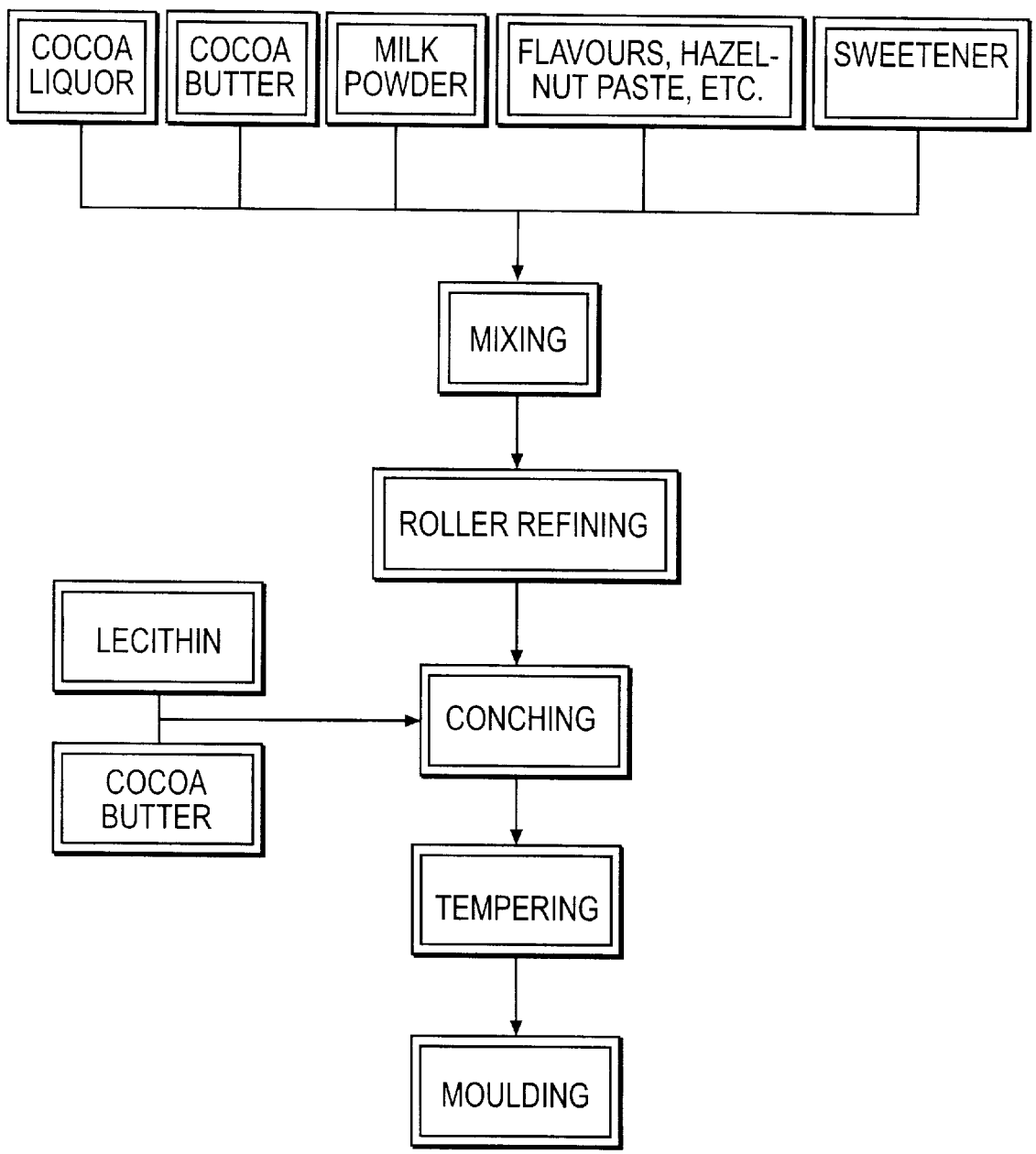
FIG. 1a is a flow chart which schematically represents the most common conventional process for making chocolate.
Figure 1B:
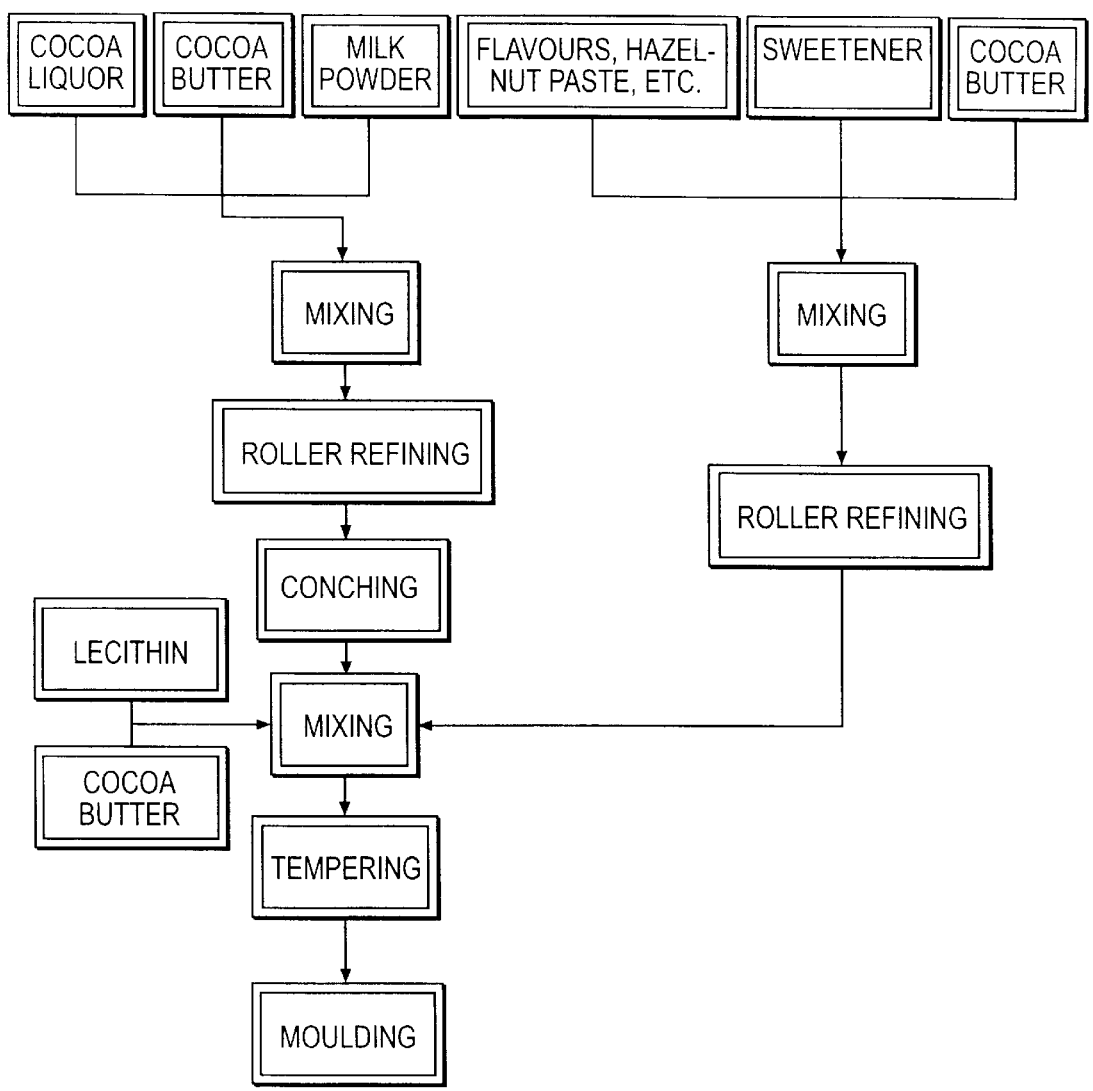
FIG. 1b is a flow chart which schematically represents the prior art crumb process for producing milk chocolate with special flavor properties.
Figure 1C:
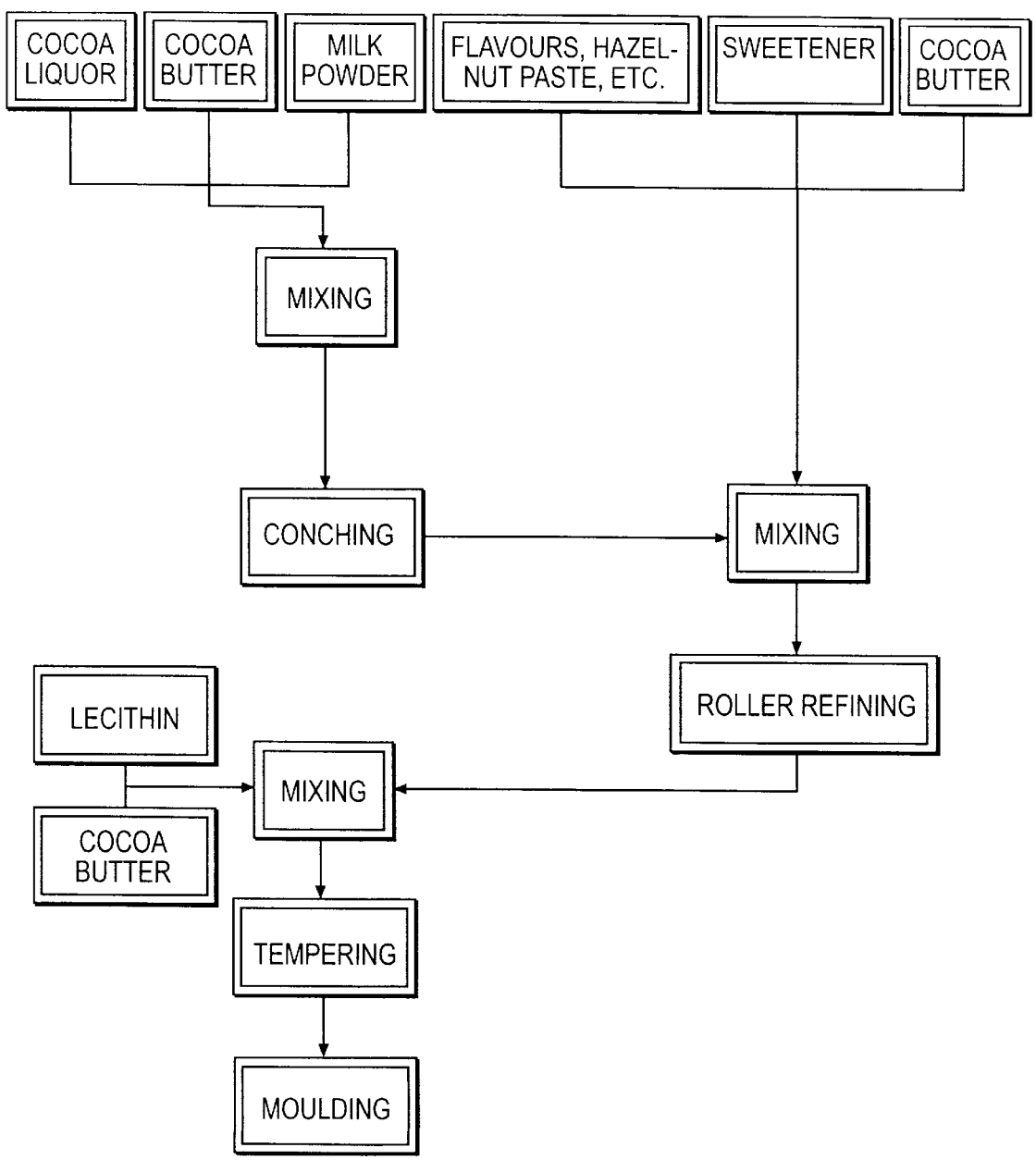
FIG. 1c is a flow chart which schematically represents a process of a first embodiment of the present invention.

The conching can be performed in the conventional manner. It was found that conching in a Petzholdt conche (moving and spraying of mass) at 60–65° C. for 16–18 hours removed off-flavours from the cocoa liquor and moisture from full cream and skimmed milk powders.

The mixing of the roller-refined and conched part of mass into the remainder of the raw materials can be performed in apparatus generally used in the art, e.g. in a Petzholdt conche or in a Stephan mixer.

In the process of the invention, only about 30–60%, preferably about 40–55% of the total ingredients is conched. This entails considerable savings in time and energy, since even though the conching time is the same as in the conventional method (for example 8–18 h), twice the necessary amount can be conched in the same time. The quantities of mass to be roller refined (unless an ultra-fine sweetener is used) are the same as in the conventional process; in the process of the invention the ingredients are only roller refined separately in two parts. The time taken up by the final mixing wherein the conched quantity of mass, the quantity of mass that has been only roller refined and the remainder of the raw materials are admixed, is very short in comparison with the conching time.

If it is considered that the presence of cocoa liquor constituents in the roller refining step of the sweetener is preferable for example for reasons of taste, the conched mass portion can be added to the mixture of sweetener and cocoa butter prior to the roller refining thereof. Also this process variant is within the scope of the present invention. Likewise, the invention comprises a process variant in which part of the sweetener is mixed with the ingredients comprising the cocoa liquor, which are to be roller refined and conched.

In addition to the savings in energy consumption and production time referred to above, the advantages of the invention include—with the use of special sweeteners (e.g. fructose or lactitol or polydextrose or inulin which are used in the production of reduced-calorie chocolate together with an intense sweetener)—avoiding of agglomerate formation which often attends these sweeteners and which renders the chocolate mass gritty and the chocolate prepared therefrom to have an unpleasantly coarse mouth feel. The process of the invention yields a smooth chocolate having a soft mouth feel also when special sweeteners are used.

The invention will be illustrated more closely by means of the following examples, which are in no way intended to restrict the scope of the invention.

EXAMPLES

Example 1

Preparation of Sucrose Chocolate

A chocolate mass was prepared from the following ingredients (percentages indicated as per cent by weight on the total mass):

| Ingredient | % |
| --- | --- |
| Cocoa liquor | 12.00 |
| Cocoa butter | 23.00 |
| Sucrose | 45.50 |
| Full cream milk powder | 18.00 |
| Hazelnut paste | 1.00 |
| Lecithin | 0.30 |
| Vanilla paste | 0.20 |

The cocoa liquor, milk powder and part of the cocoa butter, about 40% of the total ingredients, were mixed, roller refined and conched. About 56% of the ingredients (sucrose, part of the cocoa butter, vanilla paste, hazelnut paste) were only mixed and roller refined, and this quantity of mass was added together with the remaining ingredients (about 4%) to the conched quantity of mass. The savings in time and costs of the energy-consuming conche process in comparison with the methods previously employed were considerable.

The chocolate prepared from the resultant chocolate mass by conventional means was pleasant in organoleptic properties and texture.

Example 2

Preparation of Fructose Chocolate

A chocolate mass was prepared from the following ingredients (percentages indicated as per cent by weight on the total mass):

| Ingredient | % |
| --- | --- |
| Cocoa liquor | 12.00 |
| Cocoa butter | 23.00 |
| Fructose | 33.00 |
| Full cream milk powder | 19.00 |
| Skimmed milk powder | 11.48 |
| Hazelnut paste | 1.00 |
| Lecithin | 0.50 |
| Vanillin | 0.02 |

The cocoa liquor, milk powders and part of the cocoa butter, in all 51.53% of the total ingredients, were mixed, roller refined and conched; conching conditions: 60–65° C., 16–18 hours, Petzholdt conche. The fructose, part of the cocoa butter, a small quantity of the lecithin, vanillin and hazelnut paste, in all 42.32% of the total ingredients, were mixed and roller refined. The quantities of mass obtained and the remaining ingredients (6.15% of the total amount) were mixed in the Petzholdt conche (mixing time <1 h).

The resultant chocolate mass was tempered and cast into moulds in the conventional manner. The chocolate produced was pleasant in organoleptic properties and texture.

Example 3

Preparation of Lactitol Chocolate

Example 2 was repeated, but instead of fructose lactitol (32.95%) was used, and aspartame (0.05%) was added in the last mixing step which in this case was performed in a Stephan mixer.

The product corresponded in its quality to the product of Example 2.

The foregoing examples were presented for the purpose of illustration and description only and are not to be construed as limiting the invention in any way. The scope of the invention is to be determined from the claims appended hereto.

What is claimed is:

1. A process for preparing a sweetened chocolate product from chocolate raw materials comprising the steps of:

providing, by mixing, roller refining, and conching, a conched chocolate intermediate product from a part of the chocolate raw materials comprising about 30 to 60 weight percent of the total chocolate raw materials and consisting essentially of cocoa liquor and cocoa butter;

adding the remaining 70 to 40 weight percent of unconched chocolate raw materials including at least a bulk-imparting sweetener to said conched chocolate intermediate product following said conching step;

tempering the combined conched and unconched raw materials; and forming the sweetened chocolate product without employing a further conching step subsequent to the step of adding the unconched chocolate raw materials.

2. The process of claim 1, wherein said conching is performed at a temperature of 40–80C.

3. A The process of claim 3, wherein conching is performed at a temperature 65–75° C., to produce a dark chocolate product.

4. The process of claim 3, wherein said bulk-imparting sweetener is selected from the group consisting of sucrose, fructose and sugar alcohols.

5. The process of claim 2, wherein said bulk-imparting sweetener is selected from the group consisting of polydextrose, inuline and sugar alcohols.

6. The process of claim 1, wherein said bulk-imparting sweetener is selected from the group consisting of sucrose, fructose and sugar alcohols.

7. The process of claim 6, wherein said bulk-imparting sweetener is sucrose.

8. The process of claim 6, wherein said bulk-imparting sweetener is fructose.

9. The process of claim 6, wherein said bulk-imparting sweetener is lactitol.

10. The process of claim 1, wherein said bulk-imparting sweetener is selected from the group consisting of polydextrose, inuline and sugar alcohols.

11. The process of claim 10, wherein said unconched chocolate intermediate product further contains an intense sweetener.

12. The process of claim 11, wherein said intense sweetener is aspartame.

13. A process for preparing a sweetened chocolate product from chocolate raw materials comprising the steps of:
   a) providing, by mixing, roller refining, and conching, a conched chocolate intermediate product from a part of the chocolate raw materials comprising about 30 to 60 weight percent of the total chocolate raw materials and consisting essentially of cocoa liquor and cocoa butter;
   b) separately from a), providing, by mixing and roller refining, an unconched chocolate intermediate product, from the remaining chocolate raw materials comprising 70 to 40 weight percent of the total chocolate raw materials and consisting essentially of a bulk-imparting sweetener, cocoa butter, flavoring and an emulsifier;
   c) admixing said conched chocolate intermediate product and said unconched chocolate intermediate product;
   d) tempering the combined conched and unconched raw materials; and
   e) forming a sweetened chocolate product without employing a further conching step subsequent to the admixing step.

14. The process of claim 13, wherein said flavoring is vanillin.

15. The process of claim 2, wherein said bulk-imparting sweetener is selected from the group consisting of sucrose, fructose and sugar alcohols.

16. The process of claim 13, wherein said bulk-imparting sweetener is selected from the group consisting of polydextrose, inuline and sugar alcohols.

17. The process of claim 16, wherein said unconched chocolate intermediate product further contains an intense sweetener.

18. The process of claim 17, wherein said intense sweetener is aspartame.

19. A process for preparing a chocolate product from chocolate raw materials comprising the steps of:
   providing, by mixing, roller refining, and conching, a conched chocolate intermediate product from a part of the chocolate raw materials comprising about 30 to 60 weight percent of the total chocolate raw materials and consisting essentially of cocoa liquor, a milk-derived ingredient and cocoa butter;
   adding the remaining 70 to 40 weight percent of unconched chocolate raw materials including at least a bulk-imparting sweetener to said conched chocolate intermediate product following said conching step; and
   forming a chocolate product without a further conching step subsequent to the step of adding the unconched chocolate raw materials.

20. The process of claim 19, wherein said conched chocolate intermediate product further contains an emulsifier.

21. The process of claim 20, wherein said emulsifier is lecithin.

22. The process of claim 19 wherein the conching is carried out at 60–65° C.

23. A process for preparing a sweetened chocolate product from chocolate raw materials comprising the steps of:
   providing, by mixing, roller refining, and conching, a conched chocolate intermediate product from a part of the chocolate raw materials comprising about 30 to 60 weight percent of the total chocolate raw materials and consisting essentially of cocoa liquor, a part of the bulk-imparting sweetener and cocoa butter;
   adding the remaining 70 to 40 weight percent of unconched chocolate raw materials including at least the remaining part of the bulk-imparting sweetener to said conched chocolate intermediate product following said conching step;
   tempering the combined conched and unconched raw materials; and forming a sweetened chocolate product without employing a further conching step subsequent to the step of adding the unconched chocolate raw materials.

* * * * *